March 6, 1928.
W. A. COOK
1,661,466
STEAM CYLINDER VALVE OPERATING MEANS
Filed Sept. 28, 1926
2 Sheets-Sheet 1
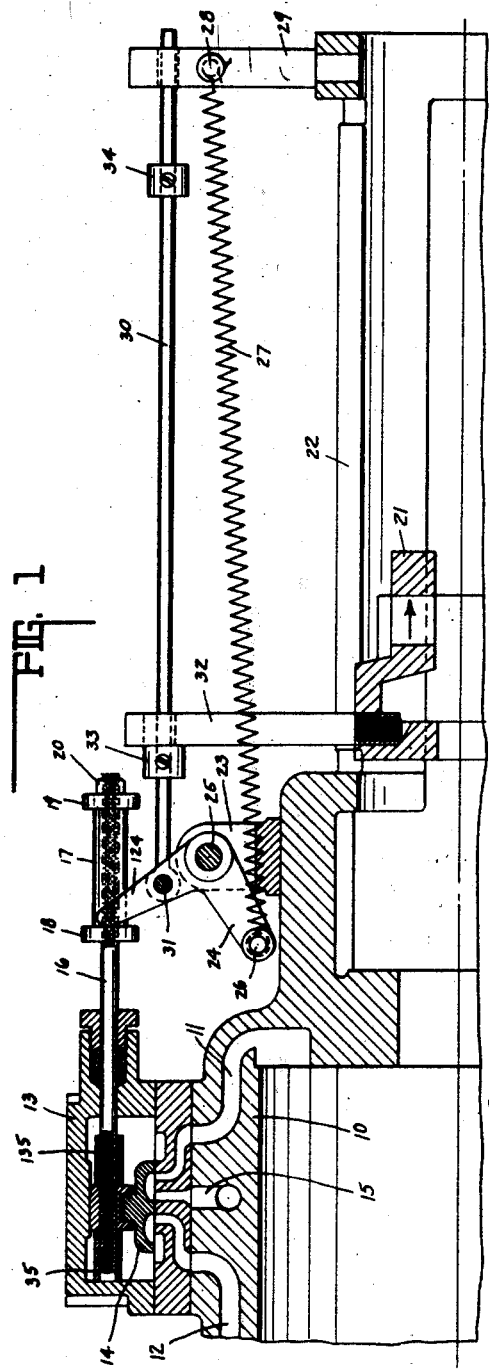
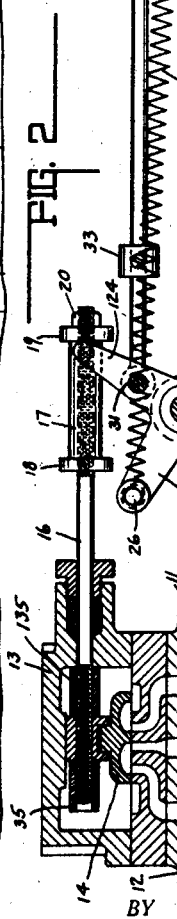
INVENTOR.
WILLIAM A. COOK.
BY
ATTORNEYS.

March 6, 1928.
W. A. COOK
1,661,466
STEAM CYLINDER VALVE OPERATING MEANS
Filed Sept. 28, 1926
2 Sheets-Sheet 2
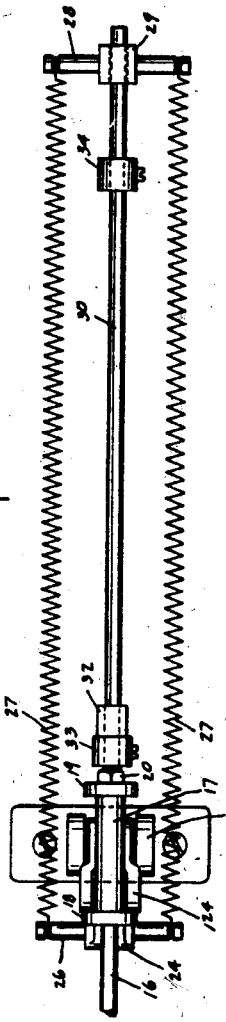
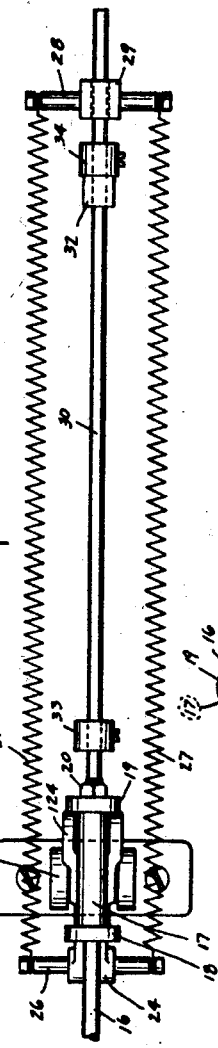
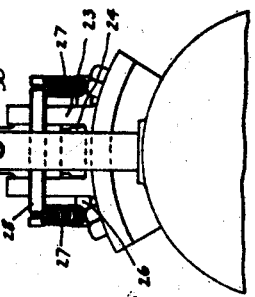
INVENTOR.
WILLIAM A. COOK.
BY
ATTORNEYS.

Patented Mar. 6, 1928.

1,661,466

UNITED STATES PATENT OFFICE.

WILLIAM A. COOK, OF MARION, INDIANA, ASSIGNOR TO MARION MACHINE, FOUNDRY & SUPPLY COMPANY, OF MARION, INDIANA, A CORPORATION.

STEAM-CLYLINDER VALVE-OPERATING MEANS.

Application filed September 28, 1926. Serial No. 138,301.

The object of this invention is the full and quick movement of a valve for controlling the passage of fluid under pressure to the cylinder of an engine. The invention is herein shown in connection with a steam engine having a slide valve, but the invention is not limited necessarily to such construction.

It is a common defect of the means for operating valves for steam engines that the valve does not act quickly and to the full extent and, therefore, impairs and impedes the supply of steam or other fluid under pressure which may be employed to operate the piston in the cylinder.

The chief feature of the invention herein for overcoming this trouble and accomplishing the object of the invention is a bell crank for engaging the valve rod and causing its complete valve-closing or valve-opening movement the instant that the end of one arm of the bell crank passes the pivotal center thereof. Means connected with the cross head of the engine moves the bell crank so that it passes the pivotal center, and springs associated with the bell crank, and preferably the end of said arm thereof, act immediately and suddenly to complete the movement of the bell crank; and the parts are arranged so that the same spring or springs will throw the bell crank each way and cause a complete and sudden movement of the valve in each direction during the operation of the device.

The full nature of the invention will be understood from the accompanying drawings and the following description and claims:

In the drawings, Figure 1 is a central vertical section through a portion of a steam engine cylinder and associated mechanism showing the valve in one limit of its movement for supplying steam to one end of the cylinder. Fig. 2 is the same with the valve in the opposite limit of its movement for supplying steam to the other end of the cylinder. Fig. 3 is a plan view of the upper part of the right-hand portion shown in Fig. 1, parts being broken away. Fig. 4 is a plan view of the upper part of the right-hand portion of Fig. 2. Fig. 5 is an elevation of the right-hand end of Fig. 1, parts being broken away.

There is shown herein a portion of a typical steam engine valve mechanism wherein there is a cylinder 10 with the piston not shown, having the usual steam ports 11 and 12 leading from a steam chest 13 having in it a slide valve 14 for opening and closing said ports 11 and 12 alternately, and also alternately bringing them into communication with the exhaust port 15. This part of the construction is of common type and needs no detailed explanation. Fig. 1 shows the valve 14 at the left-hand limit of movement, when steam passes through the port 12 and the steam is exhausting through the ports 11 and 15, and in Fig. 2 the valve is in its opposite position when steam is exhausting through ports 12 and 15 and steam is passing in through port 11.

The valve is operated by the valve rod 16 that extends into the steam chest 13. The outer end of said rod is threaded to receive a sleeve or spool 17 having on one end a collar 18 and on the other end a collar 19. Said spool is locked on the rod 16 by a nut 20.

There is the usual cross head 21 operating in a cross head slide 22. On the cross head slide is mounted a bracket 23 located under the spool 17 on the valve rod 16. A bell crank lever 24 is fulcrumed at 25 in said bracket 23 and the upper arm 124 of said lever is yoke-shaped, as seen in Figs. 3 and 4, to extend astride the spool 17 in position to engage the collars 18 an 19, as shown in Figs. 1 and 2. The other or lower arm of the bell crank lever 24 is single, as shown in Fig. 4, and carries a cross pin or pair of oppositely-extending pins 26. To these pins a pair of long spiral springs 27 is connected and they extend substantially parallel with the cross head slide and their other ends are connected to a pin or pins 28 extending horizontally through a stationary vertical post 29 which is mounted in the outer end of the cross head slide 22. This construction is such that said springs 27 will throw the bell crank lever to its limit instantly after the springs pass the pivotal center of the bell crank lever, whether it be in the lower position shown in Fig. 1 or the upper position shown in Fig. 2.

The bell crank lever is movable past its center by a rod 30 which at one end is pivotally connected at 31 with the upper arm of the bell crank lever and at the other end extends loosely through said post 29. Said post serves as a guide for said rod 29 in its movement and said rod also extends loosely through the arm 32 which is secured to the inner end of the cross head 21 and extends upwardly therefrom. Since the cross head is reciprocated by the movement of the piston, not shown, said arm 32 is moved by the cross head from the inner position, shown in Fig. 1, to the outer position shown in Fig. 2, and back again continuously. There is a hole in the post 29 and a hole in the arm 32, shown by dotted lines, through which said rod 30 passes.

On the rod 30 there are secured two collars 33 and 34. The collar 33 is near the left-hand end of the rod 30 in a position to be engaged by the arm 32 in the inward stroke of the cross head, and piston not shown, and the collar 34 is near the outer end of the rod 30 in position to be engaged in the latter part of the outward throw of the cross head. While the arm 32 is moving from the collar 33 to the collar 34 or back from the collar 34 to the collar 33, the cylinder is receiving steam through one of the ports 11 or 12. But in the last part of the inward movement of the cross head the arm 22 engages the collar 33 and pushes the upper arm of the bell crank lever from the position shown in Fig. 2 towards the position shown in Fig. 1, and in such movement as soon as the lower arm of the bell crank lever and the springs 27 pass the pivotal center 25 of said lever, the springs will suddenly finish said throw or movement of the lever to the position shown in Fig. 1. This will completely move the valve from the position shown in Fig. 2 to the left hand position shown in Fig. 1, where the sleeve 35 on the inner end of the valve rod 16 will move against and be stopped by the end of the steam chest.

The above action will cause steam to enter the cylinder through the port 12 which will move the piston, not shown, and the cross head back to the right and when the arm 32 comes into engagement with the collar 34, it will move the upper arm of the bell crank lever from the position shown in Fig. 1 towards the position shown in Fig. 2. As soon as the lower arm of the bell crank lever and the two springs 27 pass the pivotal center 25 of the bell crank lever, the springs will suddenly and completely finish such movement of the bell crank lever and bring it to the position shown in Fig. 2, which will move the valve from the position shown in Fig. 1 to that shown in Fig. 2, and the sleeve 135 on the rod 30 will engage the wall of the steam chest and limit the movement of the valve.

The operations just described are repeated constantly during the operation of the engine, and it is obvious that the means herein shown for operating the valve causes both a sudden or snap action and a complete or full movement thereof. The movement of the valve is, therefore, never slow nor incomplete, which is obviously a desirable characteristic of an engine of this type, as it causes a quick change of ports and a complete opening of the ports instantly, whereby there is an early and full passage of steam, the live steam going into one end of the cylinder and the exhaust steam leaving the other end of the cylinder.

The invention claimed is:

1. The combination with a valve, cross head and cross head slide of a cylinder, of a bell crank lever with one arm in operative connection with the valve, a spring connected with the end of the other arm of the lever, a stationary post on the cross head slide with which the other end of the spring is connected so as to be under tension, a rod pivoted at one end to the arm of the bell crank lever which is operatively connected with the valve and at its other end is slidable in said post, a collar secured on said rod near each end thereof, and an arm extending up from said cross head and between said collars, said collars being positioned on said rod so that they will be respectively moved by the arm on the cross head near each limit of movement thereof and thereby rock the lever past its center to permit the spring to throw the lever to cause a sudden complete operation of the valve.

2. The combination with a valve, valve rod, cross head and cross head slide of a cylinder, of a pair of collars secured on the valve rod and spaced apart, a bell crank lever with one arm extending between said collars and in position when the lever is operated to engage said collars alternately and operate the valve, a spring connected with the end of the other arm of said lever, a post on the cross head slide with which the other end of the spring is connected so as to put it under tension, and means movable near the end of the limits of movement of the cross head for moving said lever past its center to permit the spring to throw the lever in the direction of movement of the cross head for operating the valve.

3. The combination with a valve, valve rod, cross head, and cross head slide of a cylinder, of means for limiting the movement of the valve in each direction, a spool adjustably mounted on said rod with a collar at each end thereof, a bell crank lever with one end yoked and extending astride the spool and between the collars thereon, a spring connected with the other arm of said lever, a post on the cross head slide to which the other end of the spring is secured to put it under tension so that it will cause said lever to move the valve to and hold it at each limit of movement, and means moved at each limit of movement of the cross head for turning said lever in the direction of movement of the cross head so that the lever will pass its center and permit the spring to throw the lever.

4. A valve operating means for a cylinder, substantially as set forth in claim 3, there being two springs parallel with each other, a pin extending through the lever arm to the ends of which said springs are connected, and a pin extending through the post from the cross head to which the other ends of the springs are connected so that said spring action will be balanced.

In witness whereof, I have hereunto affixed my signature.

WILLIAM A. COOK.